(12) United States Patent
Fontenot

(10) Patent No.: US 9,592,861 B2
(45) Date of Patent: Mar. 14, 2017

(54) AXLE MOUNTED SPARE TIRE ASSEMBLY APPARATUS AND METHOD OF USE

(71) Applicant: Gary Fontenot, Ville Platte, LA (US)

(72) Inventor: Gary Fontenot, Ville Platte, LA (US)

(*) Notice: Subject to any disclaimer, the term of this patent is extended or adjusted under 35 U.S.C. 154(b) by 0 days.

(21) Appl. No.: 14/340,831

(22) Filed: Jul. 25, 2014

(65) Prior Publication Data

US 2015/0028068 A1    Jan. 29, 2015

Related U.S. Application Data

(60) Provisional application No. 61/858,300, filed on Jul. 25, 2013.

(51) Int. Cl.
*B62D 43/04*    (2006.01)
*B62D 61/12*    (2006.01)

(52) U.S. Cl.
CPC .......... *B62D 43/04* (2013.01); *B62D 61/12* (2013.01); *Y10T 29/49732* (2015.01)

(58) Field of Classification Search
CPC ...... B25H 1/0057; B25H 3/006; B62D 43/04; B62D 43/00; B62D 61/12; B62D 61/00; B62D 61/10; B62B 5/00; B60D 1/66; B60D 1/665
USPC .................................... 224/42.23; 29/402.09
See application file for complete search history.

(56) References Cited

U.S. PATENT DOCUMENTS

| | | | | |
|---|---|---|---|---|
| 810,722 A | * | 1/1906 | Cook ..................... | B62D 61/12 280/124.127 |
| 2,335,946 A | * | 12/1943 | Klaus, Sr. ................ | B60D 1/66 280/641 |
| 2,446,321 A | * | 8/1948 | Bartholomew .......... | B60D 1/66 280/43.17 |
| 2,810,588 A | * | 10/1957 | Rozett ..................... | B60D 1/66 280/414.1 |
| 2,870,851 A | * | 1/1959 | De La Parra Clark ... | B60S 9/21 180/201 |
| 3,217,478 A | * | 11/1965 | De Geere .............. | A01D 34/28 280/47.32 |
| 3,348,860 A | * | 10/1967 | Buckles ................ | B60P 3/1033 280/414.1 |
| 4,032,245 A | * | 6/1977 | Woodruff ................ | F16B 2/065 172/763 |
| 4,236,266 A | * | 12/1980 | Hannah ................ | B25B 13/005 7/100 |
| 4,517,862 A | * | 5/1985 | Garcia .................... | B25B 13/02 81/119 |
| 4,773,535 A | * | 9/1988 | Cook ....................... | B25H 3/00 206/373 |
| 4,819,800 A | * | 4/1989 | Wilson .................... | B25H 3/04 206/373 |

(Continued)

*Primary Examiner* — J. Allen Shriver, II
*Assistant Examiner* — Brian Cassidy

(57) ABSTRACT

An axle mounted spare tire assembly is disclosed for use in replacing a damaged vehicle tire or tire support structure to permit a vehicle to then travel to a vehicle repair shop. The apparatus is comprised of a saddle which surrounds and bolts onto a vehicle's axle. A support tire is mounted below the saddle on a self-locking axle and will rotate as the vehicle is driven. The saddle is provided with a plurality of bolts to facilitate attachment to round, U-shaped, and square vehicle axles. The saddle is also equipped with a detachable handle to allow for ease of attachment and transfer of the assembly to and from the damage site.

5 Claims, 6 Drawing Sheets

(56) References Cited

U.S. PATENT DOCUMENTS

| | | | | |
|---|---|---|---|---|
| 5,067,692 A * | 11/1991 | Nudd | B60D 1/66 | 254/420 |
| 5,270,911 A * | 12/1993 | Maglica | B62J 6/00 | 248/288.51 |
| 5,328,290 A * | 7/1994 | Plastina | F16B 7/0493 | 403/385 |
| 5,515,246 A * | 5/1996 | Maglica | B62J 6/00 | 362/191 |
| 5,573,329 A * | 11/1996 | van Gennep | B25B 7/22 | 248/229.13 |
| 5,813,687 A * | 9/1998 | Lay | B60P 3/1083 | 280/414.1 |
| 5,860,728 A * | 1/1999 | Maglica | B62J 6/00 | 362/191 |
| 5,971,101 A * | 10/1999 | Taggart | E06C 7/14 | 182/129 |
| 6,213,491 B1 * | 4/2001 | Southard, Jr. | B60D 1/66 | 254/420 |
| 6,364,141 B1 * | 4/2002 | Ehrgott | A47F 5/0823 | 211/103 |
| 6,435,389 B1 * | 8/2002 | Sucher | B25H 1/06 | 182/129 |
| 6,644,626 B2 * | 11/2003 | Baril | A47F 10/00 | 254/2 R |
| 6,955,367 B1 * | 10/2005 | Simonsen | A47B 83/02 | 280/47.32 |
| 7,311,568 B2 * | 12/2007 | Gibbs | B60F 3/003 | 114/344 |
| 7,434,688 B2 * | 10/2008 | Hu | B25H 3/003 | 206/377 |
| 7,788,996 B2 * | 9/2010 | Johnson | B25B 13/56 | 81/177.1 |
| 7,946,203 B2 * | 5/2011 | Johnson | B25B 15/008 | 81/177.4 |
| 8,152,037 B2 * | 4/2012 | Sabbag | B25H 3/00 | 206/373 |
| 8,181,983 B2 * | 5/2012 | Walstrom | B60S 9/21 | 254/419 |
| 8,523,148 B2 * | 9/2013 | Beck | B60D 1/66 | 254/100 |
| 8,727,556 B2 * | 5/2014 | Swan | A42B 3/04 | 362/103 |
| 8,733,779 B2 * | 5/2014 | Arakelian | B60S 9/18 | 280/475 |
| 8,925,429 B2 * | 1/2015 | Johnson | B25G 1/085 | 7/118 |
| 8,967,640 B2 * | 3/2015 | Mabe | B62B 5/00 | 280/43.17 |
| 9,033,540 B1 * | 5/2015 | McCorkle | A42B 3/044 | 362/190 |
| 9,193,058 B2 * | 11/2015 | Gallegos | B25G 3/24 | |
| 9,193,062 B2 * | 11/2015 | Johnson | B25H 3/04 | |
| 2012/0099333 A1 * | 4/2012 | Wang | F21V 21/0885 | 362/396 |
| 2012/0236543 A1 * | 9/2012 | Torgerson | F16B 9/023 | 362/106 |
| 2012/0325695 A1 * | 12/2012 | Schein | B25H 3/06 | 206/216 |

\* cited by examiner

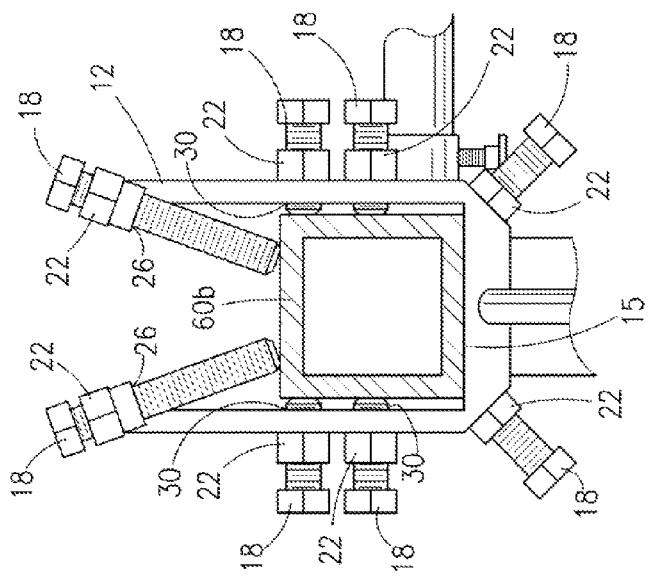
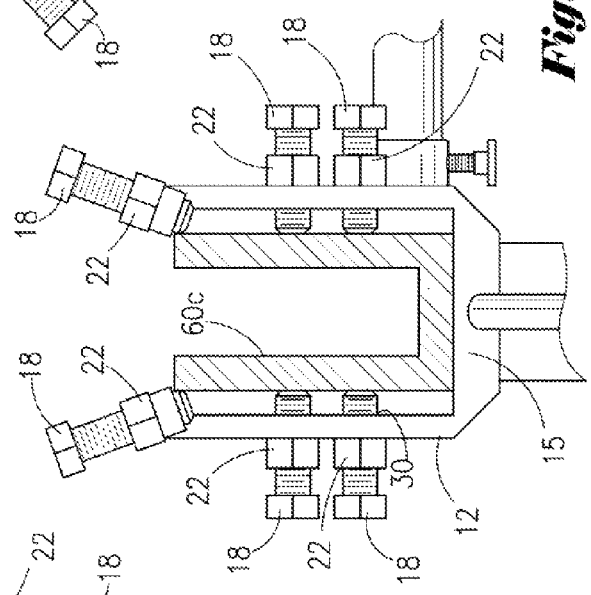
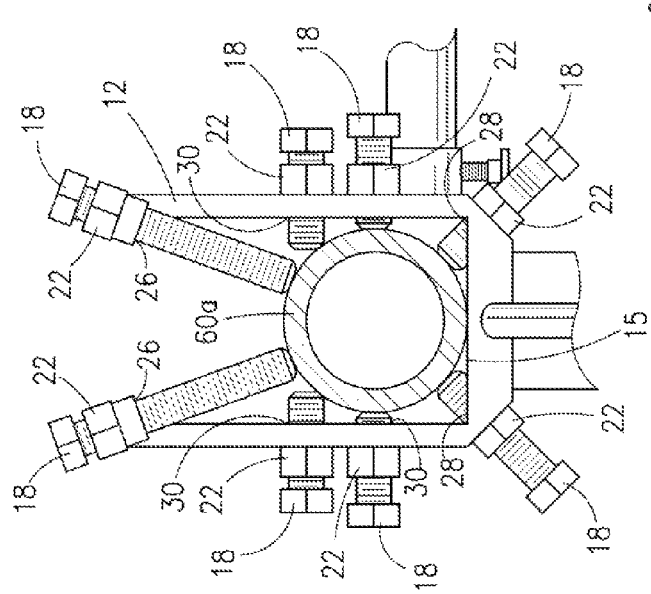

AXLE MOUNTED SPARE TIRE ASSEMBLY APPARATUS AND METHOD OF USE

PRIORITY

This application claims priority to U.S. provisional application Ser. No. 61/858,300 filed Jul. 25, 2013 entitled "Axle Mounted Spare Tire Assembly Apparatus & Method of Use", the entire content of which is hereby incorporated by reference.

FIELD OF THE INVENTION

The invention relates generally to a temporary axle-mounted spare tire assembly for a vehicle and, more particularly, to a portable and readily available spare tire apparatus for use in the event of tire damage on motor vehicles and trailers.

BACKGROUND OF THE INVENTION

Many vehicles and vehicle pulled trailers such as boat trailers and utility trailers are supplied with a spare tire to be used for replacement of a wheel and flat tire in order to return the vehicle to use. Often it is difficult to remove the wheel and flat tire because the lug nuts or bolts are often unused or rusty. It may be even more difficult to remove the wheel and flat tire in the event of broken bolt circles or stripped lug nuts.

Spare tire and wheel devices utilizing a replacement wheel and tire have been proposed. Typically such devices are attached to the frame of the vehicle or trailer where these devices are to be used. Access to the frame of the vehicle or trailer may be impeded making such frame mounting an inconvenient and undesirable location of the replacement wheel and tire.

Therefore, it can be appreciated that there exists a continuing need for a new and improved spare tire assembly for use in the event a flat tire or damage wheel is encountered by a motorist.

SUMMARY OF THE INVENTION

The present invention provides an improved temporary spare tire apparatus for mounting on an axle of a motor vehicle or trailer. The apparatus includes an axle mounting mechanism to allow attachment of the temporary replacement wheel and tire to vehicle or trailer axle regardless of the configuration of the axle. In another embodiment, the apparatus is provided with wheel adjustment mechanism that will allow the temporary replacement wheel and tire to be oriented as desired so that the apparatus may be mounted upon the aide or the frame of the motor vehicle or trailer.

The temporary spare tire apparatus is comprised of a tire and wheel assembly having an axle saddle with a support tire and self-locking axle disposed below. A plurality of bolts are arranged on the front and back face of the saddle to facilitate attachment of the apparatus to a vehicle's axle. Handles on the axle support arms and saddle are provided to assist in the positioning of the apparatus under a vehicle. The apparatus may be provided in a kit form with accompanying tools such as flashlight and wrench mounts to enable manipulation and easy attachment of the apparatus while under a vehicle.

To use the apparatus after damage to a tire, wheel, or to the wheel attachment lug nuts or bolts, the damaged side of the vehicle will be jacked up in order to lift the damaged wheel and tire. The provided tools are removed from the tire and wheel assembly. The axle saddle of the tire and wheel assembly is then positioned under the vehicle's axle, preferably near to the damaged tire or wheel and the securing bolts are then tightened to attach the axle saddle to the axle. The self-locking axle can then be tightened and adjusted to allow the support tire to rotate as the vehicle is moved.

After attachment of the apparatus, the saddle handle can be removed and the vehicle may be lowered down from the jack.

BRIEF DESCRIPTION OF THE DRAWINGS

FIGS. 4a, 4b, and 4c are cross-section end views of the axle and support yoke of the apparatus of FIG. 1 mounted on round, square, and U-shaped axles, respectively.

DESCRIPTION OF THE EMBODIMENTS

Figure 1:
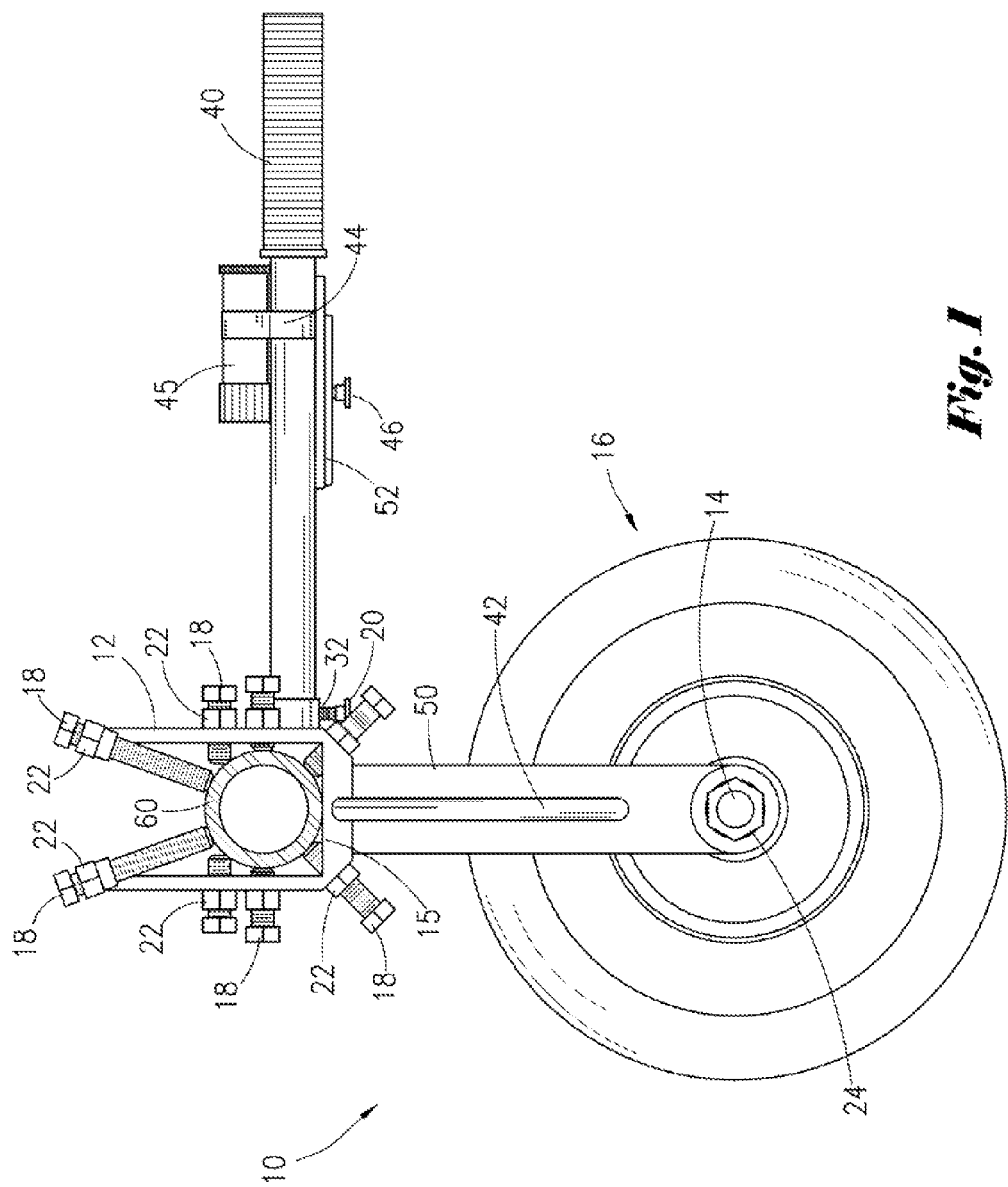
FIG. 1 is a side elevation view of the embodiment of the axle mounted spare tire apparatus attached to an axle as described herein.
Figure 3:
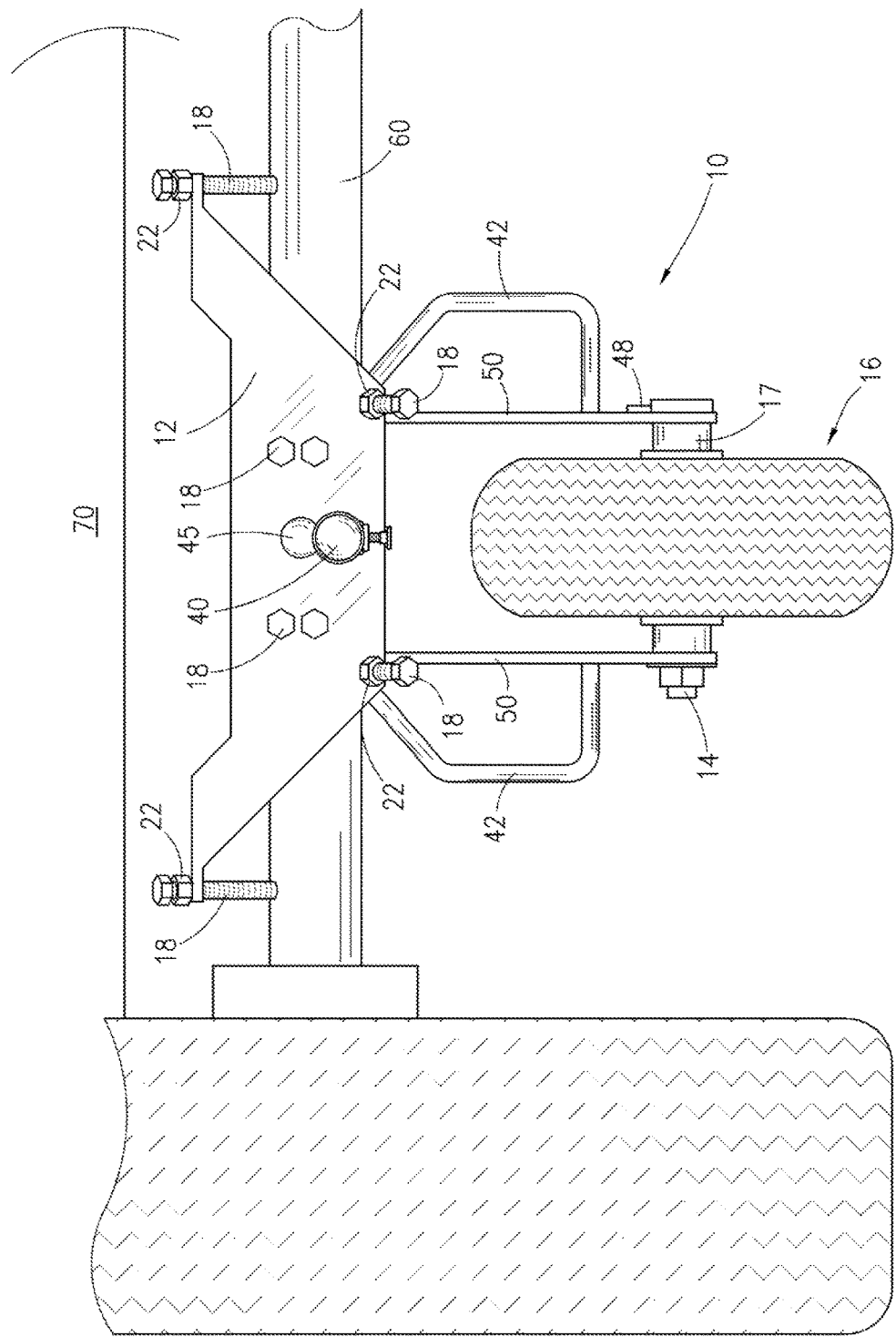
FIG. 3 is a front elevation view of the embodiment of the apparatus attached to an axle.

Referring now to the drawings and, more particularly to FIG. 1 and FIG. 3, there is shown a side elevation view of the improved temporary spare tire apparatus 10 configured for mounting on an axle 60 of a motor vehicle or trailer. Specifically the apparatus 10 has a longitudinally extending axle saddle 12, a detachable self-locking axle 14 attached to the saddle 12 by axle support arms 50, and a wheel and tire assembly 16 that is rotatable mounted on the axle 14 by means of a wheel and tire support bearing 17. A saddle handle 40 attached to the saddle 12 is provided to assist a user in positioning the apparatus 10 on the axle 60.

The axle saddle 12 of the apparatus 10 is comprised of a U-shaped yoke 15 configured to receive the vehicle axle 60 and axle support arms 50 that are configured for attachment of the self-locking axle 14 with the mounted wheel and tire assembly 16. The yoke 15 is further provided with a plurality of variously angled axle attachment bolts 18 that are threadedly attached by means of a plurality of upper attachment bolt holes 26, 28, and 30 and locking nuts 22. Positioning handles 42 may optionally be provided on the axle support arms 50.

The saddle handle 40 of the apparatus 10 may be detachably mounted to the axle saddle 12 by means of wing nut 20 through wing nut hole 32. The saddle handle 40 of the apparatus 10 may also be provided with a flashlight mount 44 for removably attaching a flashlight 45 and threadedly attached wrench mount 46 for removably attaching assembly wrenches 52. This allows for retaining and storing tools that may be used to assist in the attachment of the apparatus 10 to axle 60.

The apparatus 10 may be removably affixed to the vehicle axle 60 by placement of the U-shaped yoke 15 of the axle saddle 12 below the vehicle axle 60 and threadedly tightening the attachment bolts 18 against the vehicle axle 60. When the U-shaped yoke 15 of the axle saddle 12 is properly positioned below the vehicle axle 60, the variously angled axle attachment bolts 18 will be positioned around the vehicle axle 60 so that the securing forces applied to the axle 60 by the bolts 18 will prevent movement of the saddle 12 with respect to the axle 60. In essence, the attachment bolts 18 provide attachment forces radially around the longitudinal axis of the axle 60 to secure the saddle 12 in position.

Figure 2:
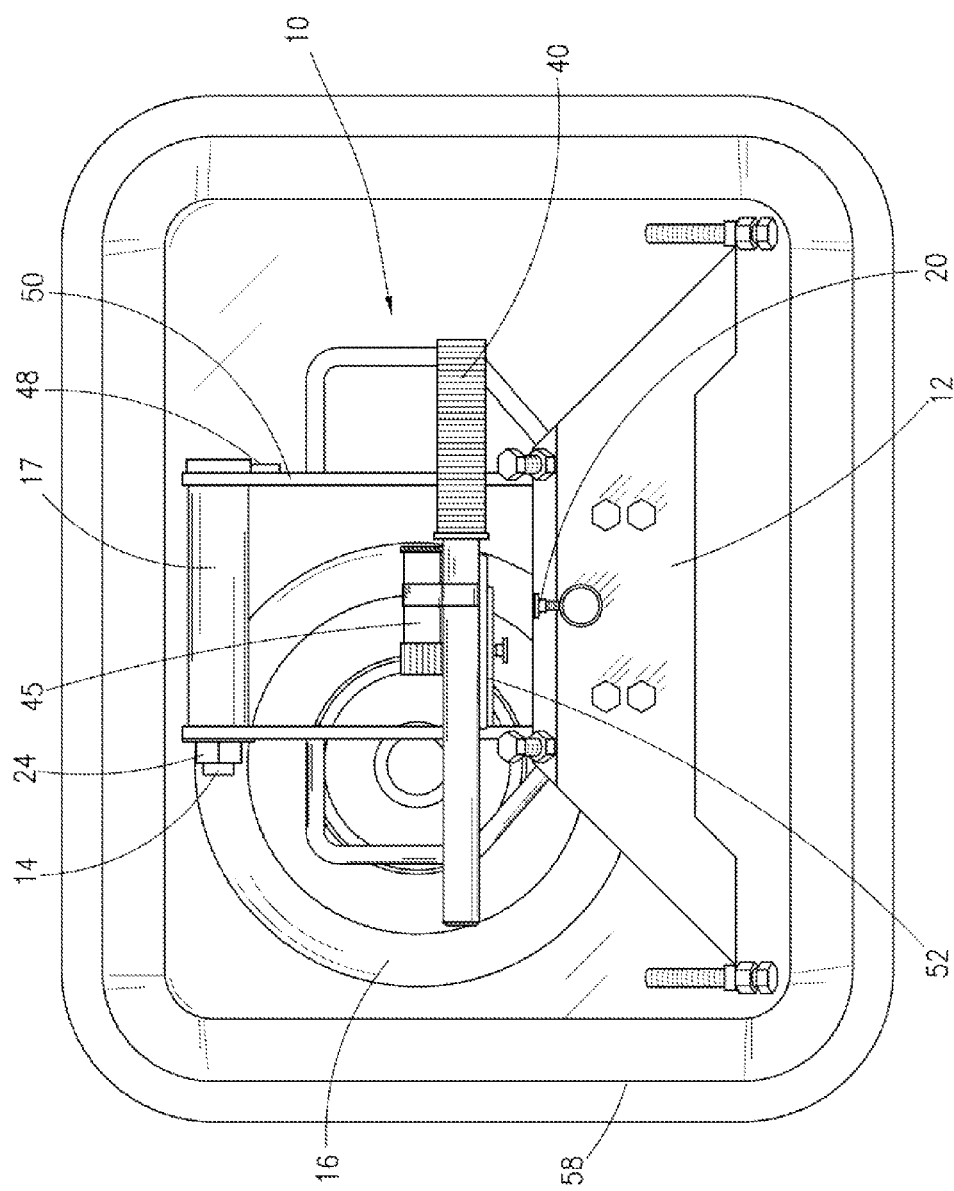
FIG. 2 is a side elevation view similar to FIG. 1 but illustrating the apparatus folded as for storage.

As shown in FIG. 2, the apparatus 10 can be disassembled and placed for easy storage. When disassembled into three pieces, the axle saddle 12, the support wheel and tire assembly 16, and the detachable saddle handle 40 of the apparatus 10 and the necessary tools for assembly such as flashlight 45 and wrenches 52 can be stored in storage case 56. For reassembly of the apparatus 10, saddle handle 40 can be removably attached to the axle saddle 12 by screwing wing nut 20 through wing nut hole 32. Support wheel and tire 16 assembly is then removably connected to the axle saddle 12 by feeding the self-locking axle 14 through the bearing 17 and through axle support aims 50 and tightening the axle nut 24 on the self-locking axle 14. As the axle nut 24 is tightened, the axle lock 4 will maintain the tension between the axle support arms 50 and the axle nut 24.

To use the apparatus 10 as a replacement tire and wheel, a vehicle 70, having an axle 60 with a damaged tire, is secured from rolling or moving by placing the vehicle 70 in park and/or blocking the tires. The vehicle 70 is then elevated by use of a jack (not pictured) and wrench 52 will be removed by unscrewing wrench nut 46 from saddle handle 40. Axle saddle 12 will then be positioned by means of saddle handle 40, and optional positioning handles 42 it so provided, beneath axle 60 so that axle 60 will be received within the U-shaped yoke 15. When situated under axle 60, it is thought that the axle saddle 12 may be positioned near to the damaged wheel side of axle 60 with the support tire 16 and self-locking axle 14 disposed downward. When so positioned the attachment bolts 18 may be tightened by means of wrenches 52 to fix the apparatus 10 to the axle 60.

Now referring to FIGS. 4*a*, 4*b* and 4*c*, axle saddle 12 is shown fitted around a round axle 60*a*, a square axle 60*b*, and U-shaped axle 60*c*, respectively. In use attachment bolts 18 and lock nuts 22 should be tightened against each axle 60*a*, 60*b*, 60*c* so that apparatus 10 does not shift while in use. Use of bolts 22 and nuts 18 may be adjusted as necessary depending upon the shape of the axle to be secured. In this way the bolts 22 may be positioned as desired depending upon the shape of the axle 60.

Figure 5:
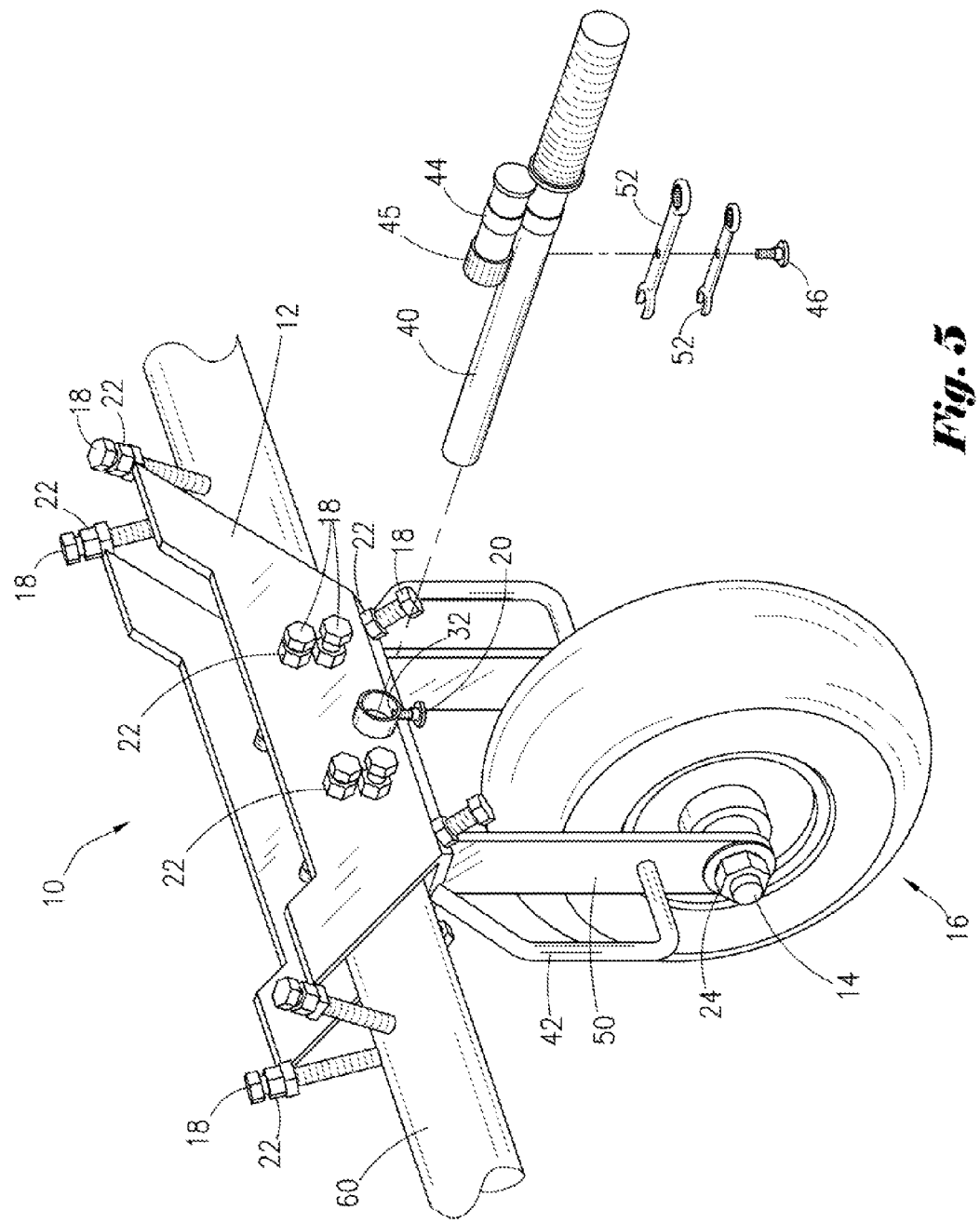
FIG. 5 is an isometric view of the apparatus attached to an axle.

FIG. 5 shows the apparatus 10 as it looks when secured to axle 60 with securing bolts 18 and lock nuts 22 engaged to maintain position of the apparatus 10 on axle 60. After attachment of apparatus 10, saddle handle 40 can be removed by unscrewing wing nut 20 from wing nut hole 32 and then vehicle 70 can be lowered down from the jack onto apparatus 10.

Figure 7:
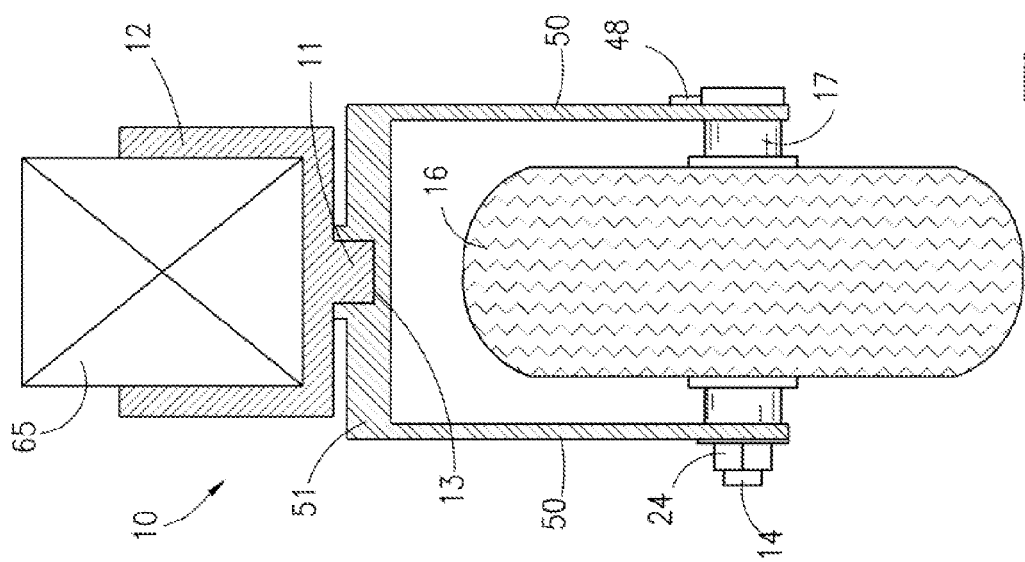
FIG. 7 is a schematic front cross-section view of an alternate embodiment of the apparatus.
Figure 6:
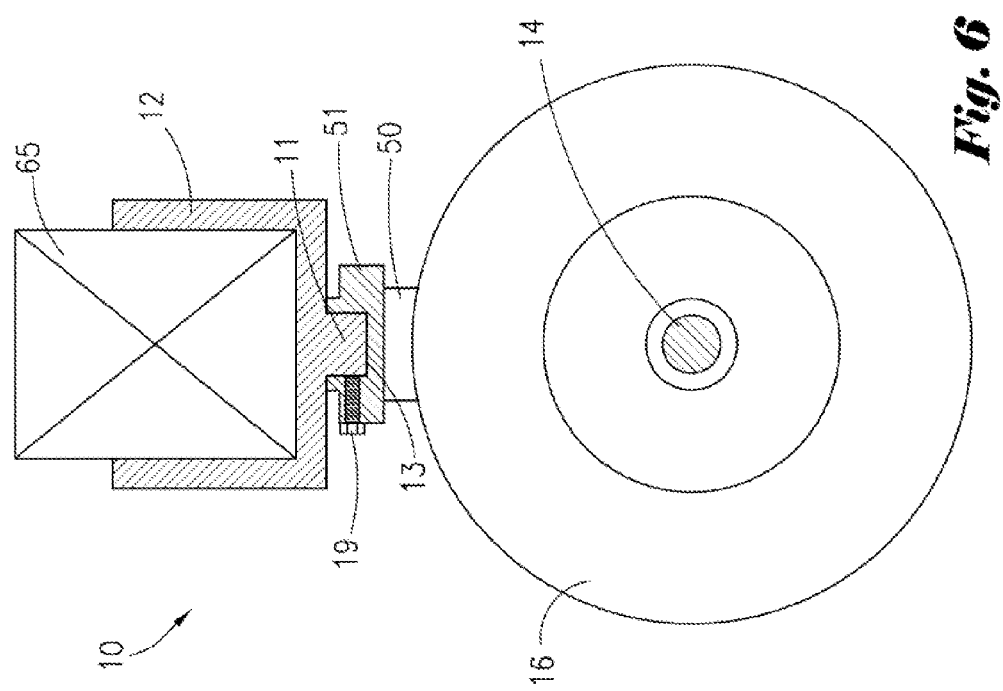
FIG. 6 is a schematic side cross-section view of an alternate embodiment of the apparatus.

Because it is often easier to get access to the axle of a vehicle having flat or otherwise disabled wheel and tire assembly, apparatus 10 is constructed to allow for mounting on that axis as a substitute for the disabled wheel and tire assembly. However, there may be situations where another mounting location, such as the vehicle or trailer frame, would be preferable. FIGS. 6 and 7 show a schematic cross-section view of an alternate embodiment of the apparatus 10. In this embodiment a means for rotating the wheel and tire assembly on the saddle yoke is described. This will allow the apparatus 10 to be mounted on a vehicle frame member that is oriented transverse to the vehicle axle.

As shown in FIG. 6, axle support arms 50 are mounted on an axle yoke 51 that is pivotally attached to saddle yoke 15 of the axle saddle 12 by means of mounting pivot 11 and pivot retainer hole 13. The pivot 11 and retainer hole 13 allow the axle yoke 51 to be rotated to a desired position. Set screw 19 fixes the pivotally attached axle yoke at the desired position upon rotation of the wheel and tire assembly 16. Typically such rotation angle will be 90 degrees though the rotation may be varied as desired.

As shown in FIG. 7 the axle yoke 51 and wheel and tire assembly 16 may be rotated for alignment with the frame member 65. This rotation will allow the apparatus 10 to be attached to a frame member 65 of the trailer of vehicle 70 and then the wheel and tire assembly 16 may be rotated and repositioned so that the wheel and tire assembly will be aligned in the direction of travel. Use of the embodiment of apparatus 10 depicted in FIGS. 6 and 7 will give the user more flexibility when selecting a mounting location on the vehicle.

It is thought that the apparatus and method of the present invention and many of its attendant advantages will be understood from the foregoing description. It is apparent that various changes may be made in the arrangement of the features of this invention without departing from its spirit and scope or sacrificing all of its material advantages. The methods described herein are merely exemplary embodiments of the disclosed invention.

I claim:

1. An axle mounted spare tire assembly comprising:
   (a) an axle saddle wherein said axle saddle having a U-shaped yoke for receiving an axle;
   (b) axle support arms attached to the bottom of said axle saddle and descending downward from said axle saddle;
   (c) an axle disposed between said axle support arms; and
   (d) a support tire positioned between said axle support arms and rotatable around said axle;
   (e) an axle securing means on said U-shaped yoke of a plurality of bolts and a plurality locking nuts, said bolts capable of threadedly engaging against said axle; and
   (f) a saddle handle removably attached to said axle saddle.

2. The axle mounted spare tire assembly recited in claim 1 further comprising, tools mounted on said saddle handle, said tools being provided for attaching said saddle to a vehicle axle.

3. The axle mounted spare tire assembly recited in claim 2 wherein said tools are wrenches and a flashlight.

4. The axle mounted spare tire assembly recited in claim 3 further comprising, positioning handles on both of said axle support arms.

5. The axle mounted spare tire assembly recited in claim 4 further comprising, an axle lock on said self-locking axle.

\* \* \* \* \*